April 25, 1944.    D. W. FENTRESS    2,347,185
WELDING METHOD AND APPARATUS
Filed Oct. 6, 1939    3 Sheets-Sheet 2
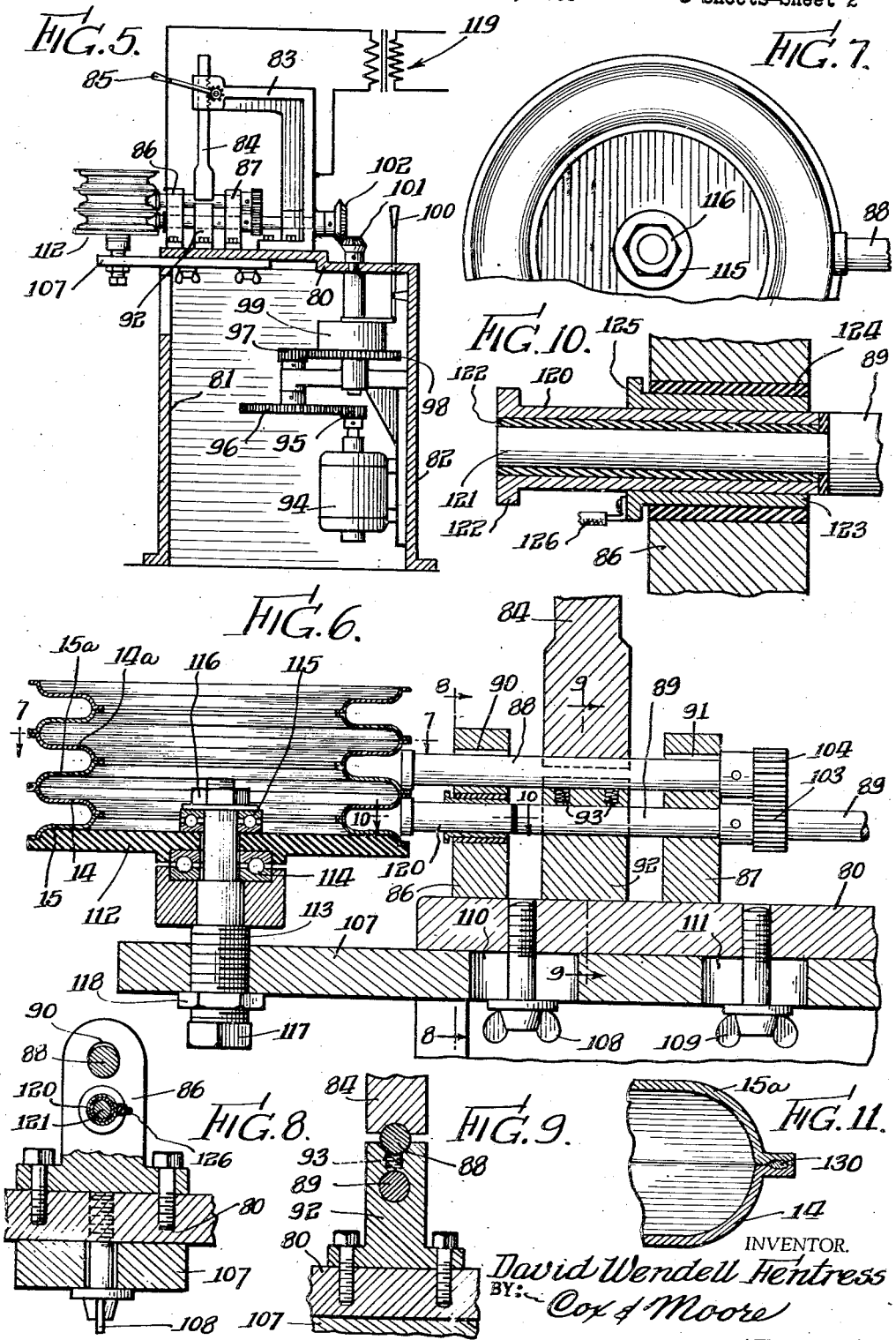

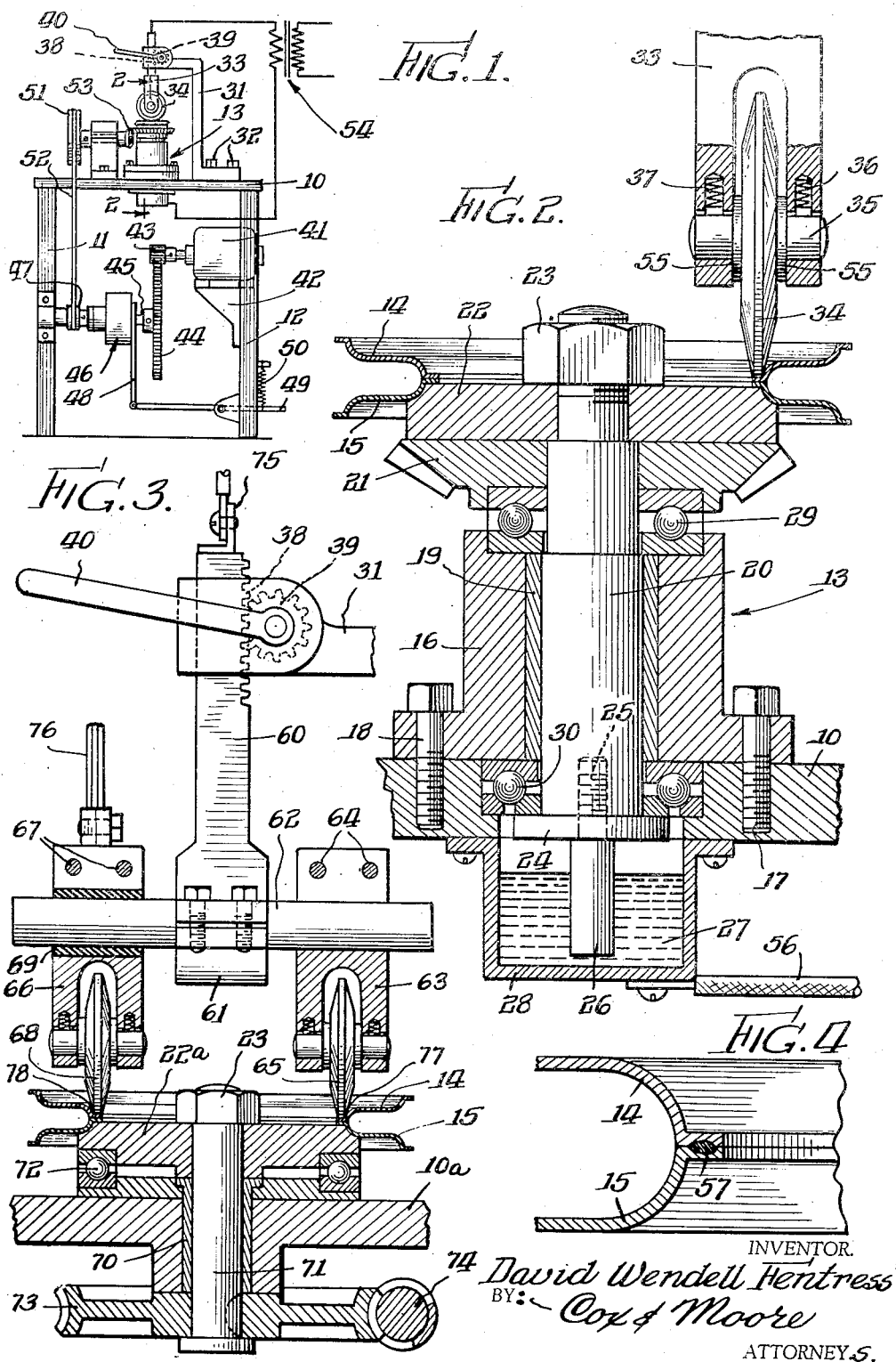

April 25, 1944.    D. W. FENTRESS    2,347,185
WELDING METHOD AND APPARATUS
Filed Oct. 6, 1939    3 Sheets-Sheet 3
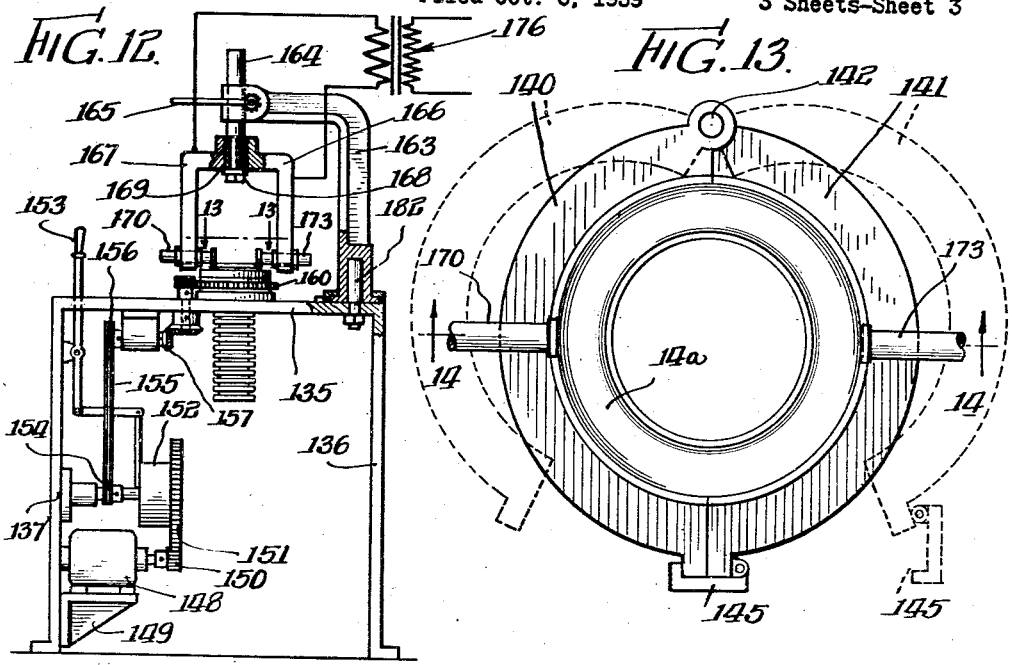
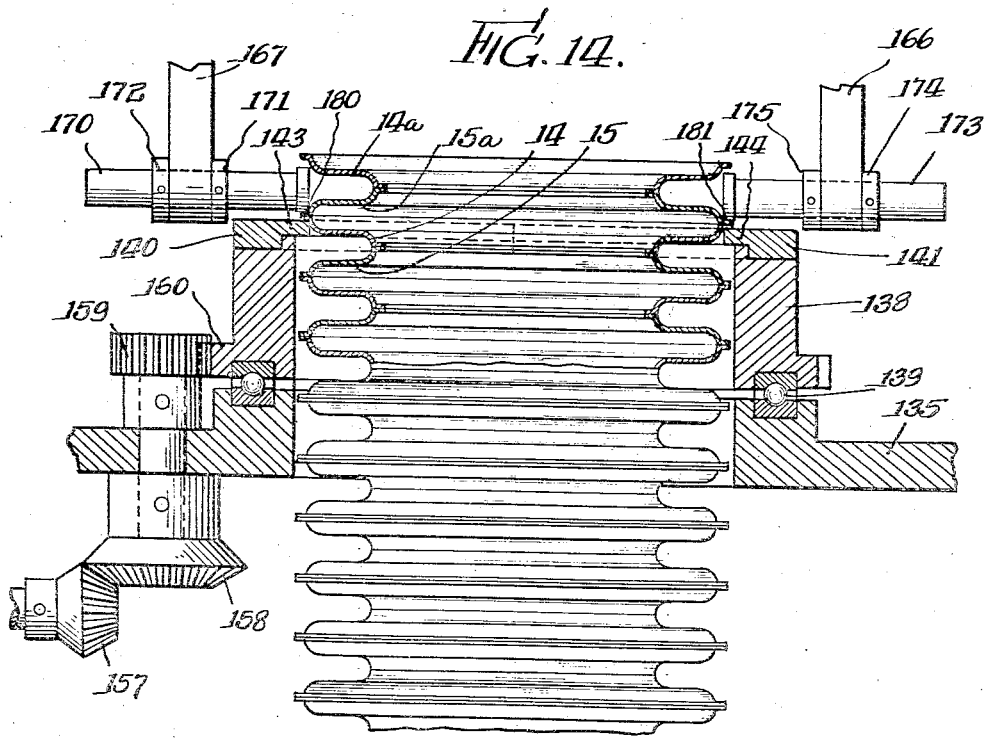
INVENTOR.
David Wendell Fentress
BY Cox & Moore
ATTORNEYS.

Patented Apr. 25, 1944

2,347,185

UNITED STATES PATENT OFFICE 2,347,185

WELDING METHOD AND APPARATUS

David Wendell Fentress, Hubbard Woods, Ill., assignor to Chicago Metal Hose Corporation, Maywood, Ill., a corporation of Illinois Application October 6, 1939, Serial No. 298,235

11 Claims. (Cl. 219—10)

This invention relates to welding methods and apparatus, particularly for use in making flexible bellows constructions of the superposed plate type.

It is a primary object of the invention to provide improved methods and apparatus for performing peripheral plate welding operations, both exterior and interior, in the making of flexible bellows of the superposed plate type.

It is a further object of the invention to provide satisfactory and readily operable welding methods and means for securing the exterior and interior peripheral plate edges in superposed plate bellows constructions, whereby to eliminate brazing or soldering operations, and other less satisfactory securing means.

Further and more specific objects of the invention are to provide welding methods and apparatus for use as above defined, which are rapid and accurate, which may be carried out by relatively unskilled operators, and which produce a strong, fluid-tight, heat-resistant and chemically-resistant seal between the plate edges.

A still further object of the invention is to provide sealing methods and apparatus for use as above defined which avoid the undue heating of the bellows plate structures whereby to avoid the annealing of the plates or the undue deterioration of the metal plate fibers.

Another and important object of the invention is to provide for peripheral plate welding wherein simultaneous welding operations occur at a plurality of spaced peripheral points whereby to materially reduce the time required to effect the complete welding operations.

In accordance with the principles of the invention methods and means are provided for sealing the exterior and interior peripheral bellows plate edges by electric resistance seam welding.

Various additional objects, advantages and features of the invention will appear from the following specification when taken in connection with the accompanying drawings wherein certain preferred embodiments of the invention are set forth for purposes of illustration.

In the drawings, wherein like reference numerals refer to like parts throughout:

Fig. 1 is a general assembly view of a welding apparatus constructed in accordance with the principles of the invention, and employing the methods thereof, particularly for effecting the welding of the inner peripheral plate edges.

Fig. 2 is a sectional detail view, on an enlarged scale, of a portion of the apparatus illustrated in Fig. 1 and taken on the line 2—2 thereof.

Fig. 3 is a view similar to Fig. 2 but illustrating a modified form of construction.

Fig. 4 is a partial detail view showing the manner in which the interior plate edges may be welded.

Fig. 5 is a general assembly view of a welding apparatus constructed in accordance with the principles of the invention and adapted for the welding of the exterior peripheral plate edges.

Fig. 6 is a detail sectional view, on an enlarged scale, of a portion of the apparatus shown in Fig. 5.

Figs. 7, 8 and 9 are detail sectional views of the structure shown in Figs. 5 and 6, on the lines 7—7, 8—8 and 9—9 respectively of Fig. 6.

Fig. 10 is a detail view of one of the electrode arbor shafts.

Fig. 11 is a detail view illustrating the manner in which the exterior plate edges may be welded.

Fig. 12 illustrates a modified form of machine for welding the exterior peripheral plate edges.

Fig. 13 is a detail sectional view, on an enlarged scale, of a portion of the structure shown in Fig. 12, and taken on the line 13—13 thereof, and Fig. 14 is a detail sectional view of the structure on the line 14—14 of Fig. 13.

Referring more particularly to the drawings, and first to the embodiment illustrated in Figs. 1 and 2, the welding apparatus provided comprises a main base frame 10 supported by legs 11 and 12. The frame 10 carries a support pedestal, generally indicated by the reference numeral 13, which is adapted to rotatably support the bellows plates 14 and 15, Fig. 2, the inner peripheral edges of which are to be welded together. More specifically the support pedestal comprises a sleeve 16 adapted to be rigidly secured to the frame 10 by any suitable means such as the bolts 17 and 18. The sleeve carries an inner bearing 19 adapted to form a journal bearing for a centrally disposed upstanding rotatable shaft 20. The upper end of the shaft carries a beveled gear 21 by means of which the shaft may be driven, and an electrode support table 22 for the bellows plates removably secured to the shaft by means of a nut or the like 23. The upper surface of the electrode support table may be suitably shaped to conform to the contour of the bellows plate to be supported, as will be seen by reference to Fig. 2.

The lower end of the shaft 20 carries a contact member 24 provided with a threaded upward extension 25 by means of which the contact member is secured to the shaft, and with a lower extension 26 adapted to be immersed in a bath of mercury 27 for a purpose later to be described. The mercury bath is carried in a reservoir housing 28 bolted or otherwise secured to the underside of the main frame 10. Anti-friction bearings 29 and 30 aid in rotatably supporting the shaft 20 and its associated parts.

The frame 10 also carries a support bracket 31, Fig. 1, adjustably secured thereto by means of bolts or the like 32. The upper end of the support bracket carries a fork member 33 in the lower end of which an electrode roller 34 is rotatably mounted. More specifically the lower forked end of the member 33 is provided with alined bores in which the axle 35 of the electrode roller is adapted to be mounted. The bores in the fork member are somewhat larger than the axle, and a pair of compression springs 36 and 37 are provided for normally urging the axle downwardly in the bore as indicated in Fig. 2. The fork member 33 is reciprocably mounted in the support bracket 31, and to effect the vertical adjustment of the fork member, the upper end thereof may be provided with rack teeth 38 as indicated in Fig. 1, cooperable with a gear 39 to which an operating lever 40 is secured. Manipulation of the lever 40 will cause corresponding raising or lowering of the fork support member 33.

Means is provided for rotating the electrode support table comprising an electric motor 41 or other suitable prime mover mounted upon a support bracket 42 secured to the leg structure 12 of the main frame. The motor drives a gear 43 adapted to mesh with and drive a gear 44 secured to a shaft 45. A clutch generally indicated by the reference numeral 46 is associated with the shaft 45, the clutch being adapted when in engaged position to clutch a pulley wheel 47 to the shaft 45 for rotation therewith, and when in disengaged position to release the pulley wheel from rotation. Any suitable form of conventional clutch mechanism may be used, and the details thereof are not illustrated. The engagement and disengagement of the clutch is controlled from a link 48 adapted to be operated by a foot treadle or the like 49 pivotally mounted upon the leg structure 12. A spring 50 normally urges the foot treadle 49 upwardly to release the clutch.

The pulley wheel 47 is adapted to drive a pulley 51 by means of a flexible belt or the like 52, the pulley 51 in turn being connected to drive a bevel gear 53 which meshes with the bevel gear 21 associated with the electrode support table.

The fork member 33 is electrically connected to one branch of the secondary of a suitable welding transformer generally indicated by the reference numeral 54. The fork member 33 is suitably insulated from its support bracket 31 and the operating lever 40. The fork member 33 transmits the welding current from the transformer to the electrode roller 34. The electrode support table 22 is connected to the other branch of the transformer secondary through the intermediary of the shaft 20, the contact member 24 and its associated projection 26, the mercury bath 27 and the contact lead 56 leading to the transformer and connected to the housing 28 for the mercury bath in a manner best seen in Fig. 2.

In the operation of the apparatus the two bellows plates, such as the plates 14 and 15, the interior peripheral edges of which are to be welded together, are first arranged as shown in Fig. 2 upon the support electrode 22. The operator then manipulates the lever 40 to bring the roller electrode downwardly into engagement with the work pieces. The compression springs 36 and 37 which form a part of the support means for the roller electrode urge the electrode into resilient engagement with the work pieces at the proper pressure, while at the same time compensating for irregularities in thickness of the parts. Proper electrical contact is assured between the support member 33 and the electrode roller by the washers 55. It is to be understood, however, that if desired the loose fit for the axle 35 may be eliminated whereby to provide additional electrical contact between the member 33 and the electrode roller, in which case suitable springs may be incorporated between yieldable body sections of the member 33 to effect the functions of the springs 36 and 37.

Assuming that the electric motor 41 is operating, the operator then manipulates the foot treadle 49 to engage clutch 46 to drive the electrode support table 22. Preferably the circuit for the welding current is also controlled from the lever 49 by means of a suitable switch, not shown, the arrangement being such that the switch is closed to initiate the welding current as the clutch is engaged, the welding circuit being broken simultaneously with the disengagement of the clutch resulting in the stopping of the rotatable support electrode. As the table is rotated, the current passes between the electrodes 34 and 22 causing the superposed interior edges of the plates 14 and 15 to be electric-resistance welded together as indicated at 57 in Fig. 4. It is to be understood that the electrode roller 34 rotates and the diaphragm plates revolve as a unit with the support table during the welding operation. Preferably the operation is continued until a complete circular resistance weld has been produced.

It will be seen that the apparatus and method provide for the accurate and rapid welding of the plate edges. The operation may be successfully carried out by relatively unskilled operators. A strong welded joint is produced which will be fluid-tight even as to gases under pressure and the most searching liquids. The joint, being formed of the parent metal of the diaphragm plates, is more heat-resistant than a soldered or brazed joint. Also, by selecting the proper metal for the plates, the welded joint may be made chemically resistant to chemicals which attack brazed or soldered connections. The electric-resistance welding does not unduly heat the diaphragm plates whereby to preclude the annealing of the plate wall structures and the deterioration of the metal structures and fibers. Diaphragm plates of various metals suitable for electric-resistance welding may be welded, the method being particularly useful, for example, in the welding of stainless steel and the like. It is to be understood that the electrodes 22 and 34 will be of suitable electrode material, for example, copper or copper alloy. Bellows plates of various size may be welded by substituting different size table electrodes, the nut 23 to this end being readily removable to permit the positioning of a table of proper size. The roller electrode 34 is properly positioned by the adjustment means 32.

In Fig. 3 an embodiment of the invention is illustrated which is generally similar to that previously described, except that two roller electrodes are provided bearing on oppositely disposed portions of the interior peripheral plate edges, so that a complete circular resistance weld may be formed by a 180 degree rotation of the support table. As illustrated, a support member 60 is reciprocable within the support bracket 31 by means of the lever 40, and insulated from the support structure, as previously described. The member 60 is provided at its lower end with a clamp portion 61 adapted to clamp and rigidly hold a cross shaft 62. One end of the cross shaft carries an electrode support bracket 63 adapted to be adjustably clamped to the shaft by means such as bolts 64. The lower end of the bracket 63 carries an electrode roller 65 adapted to engage the superposed interior peripheral edges of the diaphragm plates 14 and 15 to be welded. The other end of the shaft 62 carries a similar electrode support bracket 66 adapted to be adjustably clamped to the shaft by means of bolts or the like 67, and carrying at its lower end an electrode roller 68 adapted to engage the superposed interior edges of the diaphragm plates at a diametrically oppositely disposed point. The electrode rollers 65 and 68 may be resiliently mounted to be resiliently urged into engagement with the plate edges as previously described in reference to the electrode roller 34. An insulation sleeve 69 is interposed between the support bracket 66 and the shaft 62 whereby to insulate the bracket from the shaft.

The main bed frame 10a, similar to the frame 10 previously described, carries a bearing sleeve 70 in which the shaft 71 is rotatably journaled. The upper end of the shaft carries an electrode table 22a, similar to the table 22 previously described, held in position by the clamping nut 23. An anti-friction bearing 72 aids in supporting the table 22a. The lower end of the shaft 71 has secured thereto a gear 73 by which the shaft may be driven, the gear 72 to this end being in geared engagement with a driving worm shaft 74. One branch of the transformer secondary is connected to the support member 60 as indicated at 75, and the other branch of the transformer secondary is connected to the electrode support bracket 66 as indicated at 76.

In operation, the diaphragm plates 14 and 15 are arranged on the support table 22a in the manner previously described, and the electrode rollers 65 and 68 are then brought into resilient engagement with the superposed plate edges by manipulation of the lever 40. As the support table 22a is rotated from the worm drive shaft 74, through the intermediary of the gear 73 and the shaft 71, the diaphragm plates will be rotated therewith, causing the rotation of the two electrode rollers 65 and 68 upon their individual axes. The welding current passes from the connection 75 to the reciprocable support member 60, through shaft 62 and support bracket 63 to the first electrode roller 65. From the electrode 65 the current passes through the superposed diaphragm plate edges at one welding station, as indicated at 77, through the electrode support table 22a, the path of least resistance, through the superposed diaphragm plate edges at the other welding station as indicated at 78, and into the second electrode roller 68. The current passes back to the welding transformer from the second electrode through the support bracket 66 and the connection 76. Short circuiting of the current between the shaft 62 and the support bracket 66 is prevented by the insulation sleeve 69.

It is to be noted that in this embodiment of the invention there are two welding stations at which simultaneous welding occurs, and a complete circumferential weld will be produced by a 180 degree rotation of the support table, thus materially reducing the required time to effect the complete welding operation. Different size diaphragm plates may be welded by the substitution of different tables 22a as previously described. The electrode rollers 65 and 68 are brought to the appropriate position of adjustment by adjusting the position of the support brackets 63 and 66 longitudinally on the shaft 62.

After the securing of the inner peripheral edges of the diaphragm plates, the outer or exterior plate edges are welded by means such as illustrated in Figs. 5 to 14 of the drawings. Referring first to the embodiment shown in Figs. 5 to 10, inclusive, the apparatus disclosed comprises a main frame 80 adapted to be supported on leg members 81 and 82. The main frame carries a support bracket 83 which forms a support for a plunger member 84 mounted in the upper end of the support and adapted for reciprocation by means of the control handle 85. The frame 80 also supports a pair of bearing blocks 86 and 87 (Figs. 6 and 8) within which a pair of electrode arbors 88 and 89 are rotatably journaled. The journals in the bearing blocks for the arbor 88 are somewhat larger, as indicated at 90 and 91, than the arbor diameter, so that the arbor shaft 88 is adapted for slight vertical adjustable movement. The frame 80 also carries a bearing block 92 (Fig. 9) in which the arbors are journaled. This bearing block is arranged directly beneath the plunger member 84, the ends of the block and the plunger being in slightly spaced relation. The end of the plunger 84 is adapted on downward movement to engage the arbor 88 and force it downwardly toward or into engagement with the bearing block. The block 92 carries a pair of springs 93 normally tending to urge the arbor 88 upwardly.

Means is provided for driving the arbors 88 and 89. This means comprises an electric motor or other suitable prime mover 94, secured to the leg structure 82 and adapted to drive suitable gearing 95, 96, 97, and 98. The gear 98 is associated in driving relation with a clutch 99 controlled from a lever 100. The clutch is also associated with a bevel gear 101 in such a manner that when the clutch is engaged the gear 101 will be driven with the gear 98, and when the clutch is disengaged the operative connection between these gears will be severed. Bevel gear 101 is adapted to drive a cooperating bevel gear 102 which is fixed to the end of the arbor shaft 89. The two arbor shafts also carry cooperating gears 103 and 104, so that the arbor shaft 88 is driven synchronously with the shaft 89. The gearing 103, 104 is so arranged as to permit slight vertical movement of the arbor shaft 88 with respect to the shaft 89 without disrupting the driving relation.

An auxiliary support frame 107 is adjustably mounted on the main frame 80 by suitable readily-adjustable means, such as the wing nuts 108 and 109, the auxiliary support frame being provided with slots 110 and 111 which permit the longitudinal shiftable movement thereof with respect to the main frame upon loosening of the wing nuts. A support table 112 is rotatably carried at the outer end of the auxiliary support frame 107, the frame to this end being provided with a stud 113 threadedly mounted in the frame. The support table 112 is rotatably mounted upon the upper end of the stud by means of the anti-friction bearings 114 and 115 and a clamping nut 116. The height of the support table with respect to the auxiliary frame may be adjusted by rotating the threaded stud 113 within the auxiliary frame by means of its head portion 117. A lock nut 118 is provided for holding the stud in adjusted position.

One branch of the secondary of the welding transformer 119 is connected to any suitable part of the apparatus frame, for example, the support bracket 83, and the other branch of the transformer secondary is connected to an electrode sleeve 120 carried on the end of the arbor shaft 89, as best illustrated in Fig. 10. As will be seen, the sleeve 120 is carried on a reduced end portion 121 of the shaft 89, suitable insulation 122 being arranged between the sleeve and the shaft to prevent electrical contact therebetween. The bearing block 86 is provided with a journal sleeve 123 in which the sleeve 120 rotates, the journal sleeve 123 being electrically insulated from the bearing block 86 by suitable means such as the insulation sleeve 124. The journal sleeve 123 is provided at its end with a flange 125 to which the electrical connections 126 from the transformer are connected.

In operation, a set of diaphragm plates 14 and 15, the interior peripheral edges of which have been welded by means as previously described, is arranged upon the support table 112. A second set of plates 14a and 15b, which have also been previously welded along their interior edges, is then superposed upon the first set of plates, the adjacent edges of the two plate sets being brought into superimposed relation to effect the welding thereof. The diaphragm plates are arranged upon the support table prior to the manipulation of lever 85, the electrode arbor 88 therefor being raised slightly with respect to the arbor 89 by the springs 93, facilitating or permitting the placement and arrangement of the plates. It is to be understood that a support table 112 of proper size, depending upon the size of the diaphragm plates to be welded, will be used. The substitution of support tables may be effected by removal of the nut 116. The adjustment means 108, 109, 110, and 111 permits the proper longitudinal positioning of the support table 112 and the adjustment means 117, 118 permits the proper vertical positioning thereof.

After the plates have been properly positioned, the lever 85 is manipulated, forcing the plunger 84 downwardly, overcoming springs 93, to bring the arbors 88 and 89 relatively toward each other to clamp the exterior peripheral edges of the diaphragm plates between the wheel portions formed on the ends of the arbors. Assuming that the motor 94 is operating, manipulation of the clutch lever 100 causes the arbors 88 and 89 to be rotated through the gearing 95, 96, 97, and 98, the gearing 101, 102, and the gearing 103, 104. The rotation of the arbors causes the rotation of the diaphragm plates and the support table 112. Preferably, the clutch control lever 100 is also provided with switch means for simultaneously closing the welding transformer circuit as the clutch 99 is engaged. The welding current passes from one branch of the transformer to the electrode sleeve 120, through the peripheral plate edges to be welded, to the electrode arbor 88. From the electrode arbor 88, the current returns to the other branch of the welding transformer through the machine frame or other parts, for example, through the plunger 84 and the support bracket 83. To prevent the passage of current from the diaphragm plates into the auxiliary support frame 107, the support table 112 may be insulated if desired. As the arbors 88 and 89 are driven and the welding current applied, a circular seam resistance weld will be produced between the exterior edges of the sets of the diaphragm plates, as indicated at 130 in Fig. 11. It is to be understood that the electrode sleeve 120 and the electrode arbor 88 will be made of suitable electrode material.

After two sets of plates have been welded as described, the two sets may be arranged in superposed relation to a third set of plates upon the support table 112 and the process repeated. Diaphragms of any desired length may thus be produced as indicated in Figs. 5 and 6.

In Figs. 12, 13, and 14, a modified form of construction for welding the exterior plate edges is illustrated wherein there are two welding stations and a complete peripheral weld will be obtained by a 180 degree rotation of the diaphragm plates. As illustrated, the structure comprises a main frame 135 adapted to be supported on legs 136 and 137. The frame carries an annular electrode support table 138, the table being rotatably mounted upon the frame by means of the anti-friction bearings 139. The upper end of the support table carries a pair of split ring electrodes 140 and 141, hingedly connected to the support table, as indicated at 142 (Fig. 13). When the split rings are in their closed position as shown in solid lines in Fig. 13, the inwardly directed flanges 143 and 144 thereof form a circular support for the exterior peripheral edges of the diaphragm plates. A clamp member 145 is adapted to secure the split rings in their closed position. When the clamp member is released, the rings may be separated to their dotted line position as shown in Fig. 13, in which position the edges of the diaphragm plates will be released.

Means is provided for rotatably driving the table 138. This means comprises an electric motor 148 supported on a bracket 149, the motor being adapted to drive the gearing 150 and 151. A clutch 152 is associated with the gearing 151, the clutch being under the control of a lever 153. A pulley wheel 154 is also associated with the clutch, the pulley wheel being adapted to drive a flexible belt 155. The clutch is so arranged as to either make or break the driving connection between the gearing 151 and the pulley wheel 154. The upper end of the belt 155 drives a pulley 156 connected to a bevel gear 157. This bevel gear meshes with a bevel gear 158, Fig. 4, which is adapted to drive a gear 159, meshing with an annular gear 160 secured to the support table 138.

The main frame 135 also carries a support bracket 163 at the upper end of which a plunger member 164 is mounted for reciprocating movement under the control of the lever 165. A pair of electrode supports 166 and 167 are mounted upon the lower end of the plunger being electrically insulated from the plunger and from each other by suitable insulation devices 168 and 169. The lower end of the support 167 rotatably carries an arbor electrode 170, the electrode arbor being adjustable longitudinally of the support by means of a pair of adjustable collars 171 and 172. Similarly, the electrode support 166 rotatably carries at its lower end an electrode arbor 173 longitudinally adjustable within the support by means of collars 174 and 175. One branch of the secondary of the welding transformer 176 is electrically connected to the support 167, whereas the other branch of the transformer secondary is connected to the electrode support 166.

In operation, one set of diaphragm plates 14 and 15, the inner edges of which have been previously welded, is arranged upon the flanges 143 and 144 of the split ring electrode in the manner best illustrated in Fig. 14. The second set of diaphragm plates 14a and 15a, to be welded to the first set of plates, is then superposed upon the first set as shown. At this time, the arbor electrodes 170 and 173 are in raised position, whereby to permit the ready positioning of the diaphragm plates. In assembling the diaphragm plates into position, the first plate set 14, 15 may, if desired, be inserted upwardly through the annular table 138 and the split rings 140 and 141, then closed into gripping position. The second plate set 14a, 15a may then be laterally slipped into superposed position. It is to be understood that the annular table 138 will be of a size sufficient to accommodate the largest diaphragm plates, and the split ring electrodes 140 and 141 will be selected of the proper size to cooperate with the particular diaphragm plates to be welded. Various split ring electrodes may be mounted upon the annular support table by removal of the hinge connection 142 which, to this end, may be made readily removable.

After positioning of the diaphragm plates, the lever 165 is manipulated to bring the electrode arbors into contacting relation with the peripheral plate edges, the arbors being longitudinally adjusted by the collars 171, 172, 174, and 175, to conform to the size of the diaphragm plates. Manipulation of clutch lever 153 causes the support table 138 to be rotatably driven from the electric motor 148 through the intermediate gearing and clutch connections. The rotatable movement of the table causes the diaphragm plates and split ring electrode to rotate as a unit on a vertical axis, and the arbor electrodes rotate on their individual axes. As the welding current is applied, the current passes from one branch of the welding transformer through the support 167 to the arbor electrode 170. From this arbor electrode the current passes through the diaphragm plate edges indicated at 180, effecting the resistance welding, and then through the electrode rings 140 and 141, through the table 138, the path of least resistance, and again through the plate edges as indicated at 181 into the electrode arbor 173 and back to the other branch of the welding transformer. In view of the fact that there are two welding stations, 180 and 181, a complete circular resistance weld will be formed by a 180 degree rotation of the diaphragm plates. The arbor electrodes 170 and 173, the ring electrodes 140 and 141, and the support table 138 are preferably of copper or copper alloy.

After completion of the operation, the welded electrode plates may be lowered, a new set of plates superposed thereon, and the operation repeated to make a diaphragm of any desired length. In order that the electrode arbors may be swung clear so as not to interfere with the ready positioning of the plates, the bracket support 163 is preferably pivotally mounted upon the main frame 135, as indicated at 182.

It is obvious that various changes may be made in the specific embodiments of the invention and the method steps described without departing from the spirit of the invention. Accordingly, the invention is not to be limited to the specific embodiments and the specific method steps set forth, but only as indicated in the following claims.

The invention is hereby claimed as follows:

1. The method of making a bellows of the superposed profiled plate type, which comprises welding the inner peripheral edges of superposed pairs of annular profiled plates whereby to form individual sets of pairs of plates, arranging the welded sets of pairs of plates in superposed relation, and welding the outer peripheral plate edges of said sets of plates together whereby to form the bellows construction.

2. A welding apparatus comprising a rotatable table electrode adapted to receive a pair of superposed profiled plates, said plates having a relatively narrow annular band of contact and the support surface of said table being shaped to conform to the profiling of the plates, a roller electrode adapted to engage the face surface of the plate furthermost from the table and at a point radially displaced from the table axis of rotation and within the area of said annular band of contact, said roller electrode being mounted for rotation on an axis parallel to the plane of the table, means for rotating the table electrode and the roller electrode on their individual axes, and means for passing welding current through the plates by means of the electrodes during the rotation thereof whereby to produce a circular seam resistance weld between the plates.

3. A welding apparatus comprising a rotatable table adapted to support a pair of superposed plates, said table being formed of a plurality of members relatively shiftable within the plane of the table to facilitate the mounting of the plates thereon, a roller electrode adapted to engage the plates at a point displaced from the table axis of rotation, said roller electrode being mounted for rotation on an axis parallel to the plane of the table, means for rotating the table, and means for passing welding current through the plates by means of the roller electrode during rotation of the table whereby to produce a circular seam resistance weld between the plates.

4. A welding apparatus comprising a rotatable table adapted to receive a pair of superposed plates, said table including a split ring support portion adapted to receive the peripheral plate edges, a roller electrode adapted to engage the plates at a point displaced from the table axis of rotation, means for rotating the table and the roller electrode on their individual axes, and means for passing welding current through the plates by means of the roller electrode during table rotation whereby to produce a circular seam resistance weld between the plates.

5. A welding apparatus comprising a rotatable table adapted to receive a pair of superposed plates, said table including a split ring electrode assembly adapted to receive the peripheral plate edges, a roller electrode adapted to engage the plates at a point displaced from the table axis of rotation, means for rotating the table and the roller electrode on their individual axes, and means for passing welding current through the plates between the roller and split ring electrodes during table rotation whereby to produce a circular seam resistance weld between the plates.

6. A welding apparatus comprising a rotatable table adapted to receive a pair of superposed plates, said table including a split ring support assembly adapted to receive the peripheral plate edges, a plurality of roller electrodes adapted to engage the plates at spaced points radially displaced from the table axis of rotation, means for rotating the table and the roller electrodes on their individual axes, and means for passing welding current through the plates by means of the roller electrodes during table rotation whereby to produce a circular seam resistance weld between the plates.

7. A welding apparatus as defined in claim 3 wherein the rotatable table comprises a table electrode and wherein during table rotation the welding current is passed between the roller and table electrodes to effect the welding operation.

8. A welding apparatus as defined in claim 6 wherein the plurality of roller electrodes comprises a pair of electrodes disposed at diametrically opposite positions in respect to the table axis whereby to engage the plates at diametrically opposed points.

9. The method of welding which comprises arranging a pair of complementarily profiled plates to be welded in superposed relation so as to provide a relatively narrow band of contact between the plates, rotating the plates together as a unit on a common axis of rotation, engaging a plurality of electrodes against face surfaces of the plates at a plurality of relatively circumferentially displaced points radially displaced from said axis, said electrodes being engaged against face surfaces of the plates within the areas of said band of contact and providing pressure engagement against said surfaces substantially normal to the plane of said band of contact, and passing welding current through the plates by means of the electrodes during plate rotation and while the electrodes remain in continuous engagement with the plates whereby to produce a circular seam weld between the plates.

10. The method of making a bellows of the superposed profiled plate type, which comprises engaging a pair of complementarily shaped profiled plates to provide therebetween a relatively narrow annular band of contact adjacent the inner peripheral edges of the plates, providing an annular weld extending along the length of said band of contact whereby to secure the plates together and provide a plate set, engaging said plate set with a similarly formed plate set to provide a relatively narrow annular band of contact adjacent the outer peripheral edges of the contact plates of said sets, and thereafter providing an annular weld extending along the length of said last named annular band of contact to provide a bellows construction.

11. The method of making a bellows of the superposed profiled plate type, which comprises engaging a pair of complementarily profiled plates whereby to provide a relatively narrow annular band of contact between the plates adjacent one of the marginal edges of the plates, engaging an electrode against the plates along the length of said annular band of contact while applying welding current to the electrode whereby to provide an annular weld between the plates along said band of contact, engaging the set of plates thus formed with a set of similarly formed plates whereby to provide a relatively narrow annular band of contact between the contacting plates of said sets adjacent plate edges opposite from the first welded edges, and engaging an electrode along the length of said second named band of contact while applying welding current to the electrode, thereby welding said sets of plates together to provide a bellows construction.

DAVID WENDELL FENTRESS.